UNITED STATES PATENT OFFICE.

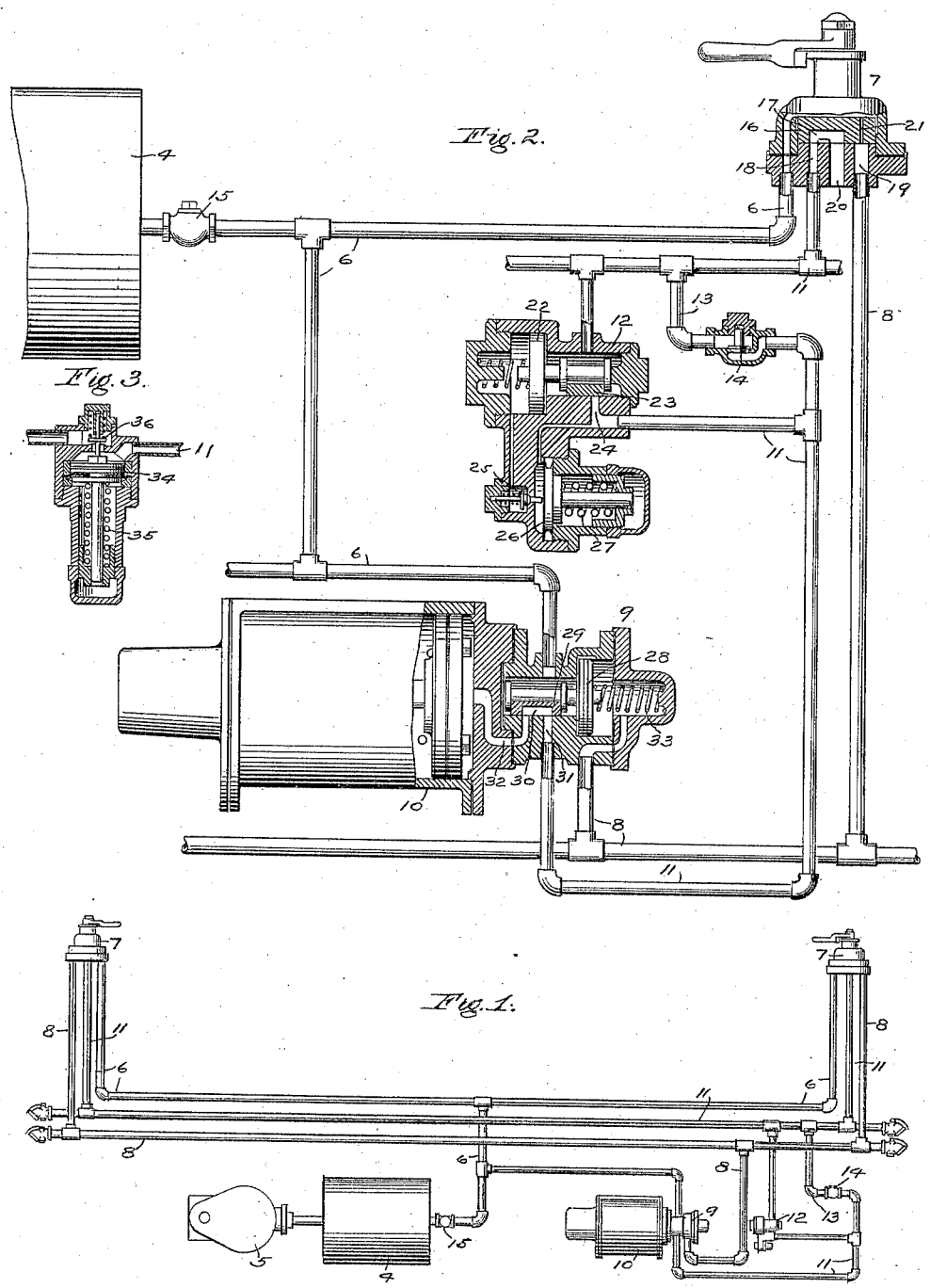

WALTER V. TURNER, OF EDGEWOOD, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

COMBINED AUTOMATIC EMERGENCY AND STRAIGHT-AIR BRAKE.

965,613.          Specification of Letters Patent.        Patented July 26, 1910.

Application filed November 13, 1906. Serial No. 343,185.

*To all whom it may concern:*

Be it known that I, WALTER V. TURNER, a citizen of the United States, residing at Edgewood, in the county of Allegheny and State of Pennsylvania, have invented new and useful Improvements in Combined Automatic Emergency and Straight-Air Brakes, of which the following is a specification.

This invention relates to fluid pressure brakes, and more particularly to a combined automatic emergency and straight air brake apparatus, wherein direct or straight air is employed for ordinary service applications, while in case of a pulling apart of the cars, or a sudden reduction in train pipe pressure produced from any cause, the automatic emergency valve device operates to supply air at maximum pressure to the brake cylinder. This form of equipment is especially adapted for use in power traction service, such as electric cars, where two or three cars are sometimes run together in a train, but at other times cars are operated singly, and the principal object of this present invention is to provide an improved apparatus of this type, whereby with the same reservoir or source of compressed air supply the maximum degree of pressure admitted through the brake valve to the brake cylinder will be limited in service applications to an amount less than that carried in the reservoir, but in emergency applications the automatic valve device will operate to supply a higher degree of pressure to the brake cylinder.

In the accompanying drawing, Figure 1 is a diagrammatic elevation of a car brake equipment embodying one form of my improvement; Fig. 2 a similar diagrammatic view of a portion of said apparatus on a larger scale, the valve mechanism being shown in vertical section; and Fig. 3 a sectional view of another form of reducing valve device.

According to the construction shown the car brake equipment comprises a reservoir 4, which may be charged with compressed air in any desired manner, such as by a motor-driven pump 5, a reservoir pipe 6 extending from said reservoir to a motorman's brake valve 7, preferably one at each end of the car, a train pipe 8 extending through the car and connected to the brake valves and to the automatic emergency valve device 9, preferably mounted on the brake cylinder 10 and also connected with the reservoir supply, and a straight air pipe 11 leading from the brake valve, or valves, to the emergency valve device and the brake cylinder.

According to my improvement, means, such as a reducing valve 12, are employed for limiting the maximum degree of pressure admitted to the brake cylinder through the straight air pipe in service applications to an amount less than that normally carried in the reservoir, and, preferably, the reducing valve is located in the straight air pipe connection between the brake valve and the brake cylinder. A by-pass connection 13, containing outwardly opening check valve 14, may be provided around the reducing valve for permitting the release of air from the brake cylinder through the brake valve. The form of reducing valve shown in Fig. 2 is of the slide valve type, having piston 22 operating slide valve 23, controlling port 24 and diaphragm 26 with spring 27 for operating vent valve 25 to control the pressure on the operating piston 22, the construction and operation of which device is well known. Any other desired form of reducing valve may be employed, such, for instance, as shown in Fig. 3, in which the diaphragm 34 and spring 35 operate puppet valve 36. This valve 36 will also serve as an outwardly opening check valve, so that the additional by-pass connection will not be required with this form of reducing valve.

As shown in Fig. 2, the brake valve chamber communicates with the reservoir, and the valve seat is provided with ports 18 and 19, communicating with the straight air pipe 11 and the train pipe 8 respectively, while the rotary valve 16 has a through port, not shown, for supplying air from the reservoir to the straight air port 18, a port 21 communicating with the train pipe port 19 in normal or release position, and a cavity 17 for connecting the straight air port 18, or the train pipe port 19, with the exhaust port 20.

The automatic emergency valve device 9 comprises a casing connected to the reservoir pipe and containing a piston 28 and slide valve 29 having a cavity 30, which normally affords communication between port 31 of the straight air pipe and port 32 leading into the brake cylinder 10, the piston 28 being subject on its outer side to the train pipe pressure through pipe 8 and normally held at its inner position by spring 33.

The train pipe 8 and straight air pipe 11 are preferably extended to the ends of the car and provided with the usual cocks and couplings for connecting the same to corresponding pipes on adjacent cars for controlling the brakes through the train, and, if desired, a check valve 15 may be located in the pipe 6 near the reservoir.

In the normal running or release position of the brake valve, the brake cylinder is open to the atmosphere through pipe 11 and ports 18 and 20, while the train pipe 8 is charged with air from the reservoir through ports 21 and 19.

It will be understood that in running one or more cars, all the brake valves except the one at the head end of the first car will be set in lap position and the pipe connections cut out, then when an ordinary service application of the brakes is to be made this head brake valve is turned to supply air from the reservoir through port 18 to straight air pipe 11 and through the reducing or feed valve device 12 to the brake cylinder. A higher degree of pressure is carried in the reservoir than is desirable for brake cylinder pressure in service applications, and the feed valve is adjusted to limit the pressure which may be admitted through the straight air pipe to the brake cylinder to the desired maximum degree. To release the brakes, the brake valve is turned to the normal position, shown in Fig. 2, whereupon the brake cylinder pressure raises the check valve and flows out through port 20 to the atmosphere. In this manner the pressure admitted to all the brake cylinders may be readily controlled and an excessive braking pressure prevented in all service applications.

The automatic emergency valve normally occupies its inner position and affords a communication between the straight air pipe and the brake cylinder, but when a sudden reduction in train pipe pressure is made, either by a break-in-two of the train, the opening of a conductor's valve, or the movement of the brake valve to emergency position, in which the cavity 17 connects train pipe port 19 with exhaust port 20, the piston 28 moves out under the predominating reservoir pressure and actuates the slide valve to cut off communication from the straight air pipe to the brake cylinder and open communication from the reservoir through port 32 to the brake cylinder, thereby applying the brakes with the maximum pressure obtainable. This operation takes place on each car, so that even if the cars are pulled apart the brake cylinder pressure cannot escape through the straight air pipe, as this has now been cut off from the brake cylinder by the emergency valve. In order to release after an emergency application the brake valve is returned to normal release position, Fig. 2, whereupon air from the reservoir equalizes through port 21 and pipe 8 upon the outer face of emergency piston 28 and the spring 33 returns the valve to normal position. This again establishes communication between the brake cylinder and the straight air pipe, and air from the brake cylinder is then released through ports 18 and 20 of the brake valve, as before described.

This improved construction has the advantage that a higher maximum braking pressure is held in reserve for emergency applications for stopping the car, or train, in the shortest possible distance, while the maximum braking pressure obtainable in straight air service applications is limited to a safe degree which will not produce wheel sliding nor a rough handling of the cars in making stops.

Having now described my invention, what I claim as new and desire to secure by Letters Patent, is:—

1. In a fluid pressure brake, the combination with a reservoir, train pipe, brake cylinder, straight air pipe, and a brake valve for controlling the supply of air from the reservoir to the straight air pipe, of a reducing valve for limiting the brake cylinder pressure in service applications, and an automatic valve device operating under a reduction in train pipe pressure to open direct communication from the reservoir to the brake cylinder.

2. In a fluid pressure brake, the combination with a reservoir, train pipe, brake cylinder, straight air pipe, and a brake valve for controlling the supply of air from the reservoir to the straight air pipe, of a reducing valve between the brake valve and the brake cylinder for limiting the brake cylinder pressure in service applications, and an automatic valve device operating under a reduction in train pipe pressure to open direct communication from the reservoir to the brake cylinder.

3. In a fluid pressure brake, the combination with a reservoir, train pipe, brake cylinder, straight air pipe, and brake valve for controlling the supply of air from the reservoir to the straight air pipe, of means for limiting the maximum degree of brake cylinder pressure in service applications to an amount less than that carried in the reservoir, and an automatic valve device normally establishing communication from the straight air pipe to the brake cylinder, but adapted to operate under a sudden reduction in train pipe pressure to close said communication and to open communication from the reservoir to the brake cylinder to supply a higher degree of pressure thereto.

4. In a fluid pressure brake, the combination with a reservoir, train pipe, brake cylinder, straight air pipe, and a brake valve for controlling the supply of air from the reservoir to the straight air pipe, of a reducing valve in the straight air pipe connection between the brake valve and brake cylinder for limiting the brake cylinder pressure in service applications, a by-pass connection around said reducing valve and containing a check valve, and an automatic valve device operating under a sudden reduction in train pipe pressure to open communication from the reservoir to the brake cylinder and supply a higher pressure thereto in emergency applications.

5. In a fluid pressure brake, the combination with a reservoir, train pipe, brake cylinder, straight air pipe, and a brake valve having connections with the reservoir, the train pipe, and the straight air pipe, of a reducing valve for limiting the maximum degree of pressure admitted through the straight air pipe to the brake cylinder in service applications, and an automatic valve device adapted to operate under a sudden reduction in train pipe pressure to open communication from the reservoir to the brake cylinder and supply a higher pressure thereto in emergency applications.

6. In a fluid pressure brake, the combination with a source of fluid pressure, train pipe, brake cylinder and a reducing valve, of a manually operated valve for controlling the supply of air from the source of fluid pressure through said reducing valve to the brake cylinder, and a valve device operated by variations in train pipe pressure for supplying air directly from said source of pressure to the brake cylinder.

In testimony whereof I have hereunto set my hand.

WALTER V. TURNER.

Witnesses:
R. F. EMERY,
J. B. MACDONALD.